No. 881,127. PATENTED MAR. 10, 1908.
H. JACOB.
INSTRUMENT FOR OPTICALLY MEASURING DISTANCES.
APPLICATION FILED JULY 16, 1907.
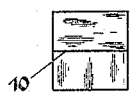
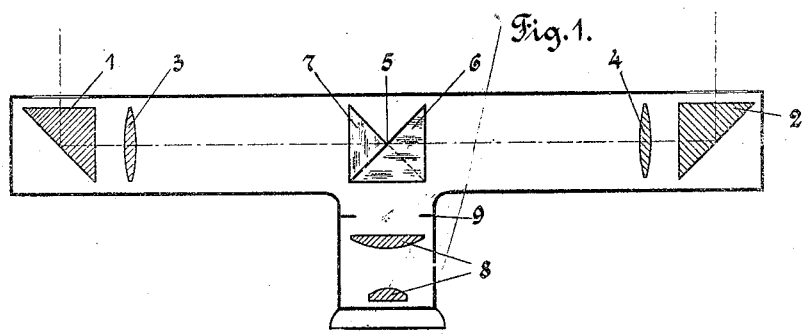
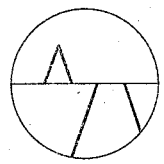 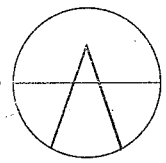 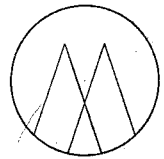 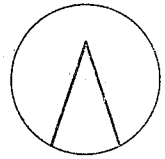
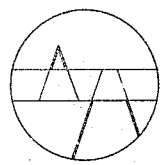 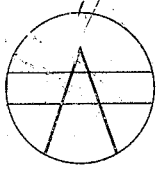

UNITED STATES PATENT OFFICE

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

INSTRUMENT FOR OPTICALLY MEASURING DISTANCES.

No. 881,127.   Specification of Letters Patent.   Patented March 10, 1908.

Application filed July 16, 1907. Serial No. 383,960.

*To all whom it may concern:*

Be it known that I, HEINRICH JACOB, a citizen of the German Empire, and resident of Steglitz, near Berlin, Germany, engineer, have invented certain new and useful Improvements in Instruments for Optically Measuring Distances, of which the following is a specification.

My present invention relates to an optical distance-measurer provided at the end points of a base of the instrument with two reflectors or prisms the images of which are observed through a single ocular, there being arranged in front of the ocular an image-uniting body consisting of crossed prisms or reflectors. In distance-measurers of this kind the determination of the distance of a certain object viewed through the instrument is effected by producing an image with the aid of each of the two reflectors at the end points of the base, the two pictures being brought into the field of view of the ocular, each by an element of the uniting body provided therefor, and appearing in said field of view as part pictures or double pictures, which can be united to a complete or single picture by suitable adjustment of the instrument. The said adjustment for uniting the two pictures to a single picture stands in a definite relation to the distance of the object in question, so that the distance can be ascertained from the adjustment of the instrument.

The reliability of the indications of the instrument is dependent upon the separate images being united to a complete picture or single picture with complete sharpness. In practice it is, however, difficult to ascertain at what moment the outlines of part pictures come exactly together so that a uniform single picture is produced, and it is also difficult to cause the double pictures to exactly register.

According to the present invention the sharp adjustment of the instrument is facilitated by a special arrangement of the image-uniting body whereby the observer is enabled to combine the adjustment for uniting part pictures with an adjustment for making separate pictures register. For this purpose the image-uniting body consisting of crossed prisms or reflectors is arranged between the objectives and the ocular of the instrument at such a distance from the common image-plane of the objectives and the ocular that between two separated half-pictures there is a central zone with double images, which latter coincide when the instrument is adjusted with regard to a certain object and form with the half or part images a single complete image of the object with regard to which the instrument is adjusted.

The invention is illustrated in the annexed drawing in which: Figure 1 is a diagrammatic representation of an instrument constructed according to the invention. Fig. 2 a front view of the image-uniting body, seen from the ocular side, while Figs. 3, 4 and 5 show the forms of the images appearing in the field of view before adjustment, with different arrangements of the image-uniting body relatively to the ocular image-plane of the instrument, and Figs. 6, 7 and 8 show the corresponding complete and single pictures appearing in the field of view when sharp adjustment is obtained.

In the form of construction of the instrument shown, there are arranged at the end points of a base, prisms 1 and 2 which reflect the rays entering them towards the objectives 3, 4 from which they pass to the image-uniting body 5, which in the example shown consists of the two crossed prisms 6 and 7. The ocular of the instrument is marked 8. The common image-plane of the objectives 3, 4 and ocular 8 is indicated at 9. It can be seen that the image-uniting body 5 is outside the image-plane 9. Owing to the fact that the separating edge 10 of the prisms 6 and 7 of the image-uniting body is outside the image-plane 9 it results that the light rays after passing the prisms 6 and 7 cross each other uninterruptedly so that in the zone in which this crossing of the light rays takes place, there are produced double pictures of the objects imaged, while outside this zone only single part pictures are observed. The character of the image appearing in the field of view of the instrument is therefore that illustrated in Fig. 5. If on the other hand the uniting body is so arranged that the separating edge 10 coincides with the image-plane 9 the image produced would lack the central double image zone, and the picture would have the character of the form shown in Fig. 3. If on the other hand the distance of the body 5 from the image-plane of the instrument were so selected that the rays passing through the prisms of the picture-uniting bodies could cross each other without hindrance for the entire extent of the field of view, the image produced would have the character of a double image within the entire field of view, as shown in Fig. 4. It will, however, be seen that as was moreover mentioned in the introduction of this specification, the uniting of two part images, as shown in Fig. 3, and of the two single images of the double image shown in Fig. 4, is more difficult to effect with perfectly sharp limiting edges than the uniting of images consisting of three elements as shown in Fig. 5.

The difficulty of uniting part images as shown in Fig. 3 is particularly great if they are images of small height, for example points of light at a distance.

The uniting of double images as shown in Fig. 4 to a single image is of exceptional difficulty if they are images with a large number of intersecting lines, for example tree branches and the like. The uniting of images as shown in Fig. 5 is, on the other hand, in all cases easy to effect, since in this case the two methods of adjustment are combined, so that with objects with which the adjustment according to Fig. 3 is difficult, the adjustment can be made with the double images according to Fig. 4, whereas inversely with objects with which it is difficult to observe coincidence of double images, the uniting to a single image can be easily effected with the part images available. The uniting of the two images can be effected in known manner by adjusting one or more prisms or one or both objectives or by special additional and adjustable parts included into the path of the rays. I have dispensed with the illustration of such special adjusting means on the drawing because such means are generally known and do not form part of my invention.

Having now particularly described and ascertained the nature of my said invention and in what manner the same is to be performed, I declare that what I claim is:—

1. In an optical distance measuring instrument comprising two objectives arranged at a distance from each other, each coöperating with a prism, said prisms arranged likewise at a distance from each other, an image-uniting body between said two objectives and coöperating prisms and an ocular in front of said image-uniting body adapted to receive the rays coming from said image-uniting body and having an image-plane coinciding with the image-plane of the said two objectives, the image-uniting body being situated at such a distance from the common image-plane of the objectives and ocular that between two separated half pictures there is produced a central zone with double images, which latter coincide on adjustment of the instrument for a given object and form with the half or part images a single full image of the object for which the adjustment is made.

2. In an optical distance measuring instrument comprising two objectives arranged at a distance from each other, each coöperating with a prism, said prisms arranged likewise at a distance from each other, an image-uniting body provided with two reflecting surfaces forming an angle with each other, and being adjustable with relation to each other, said image-uniting body being situated between said two objectives and coöperating prisms and an ocular in front of said image-uniting body adapted to receive the rays coming from said image-uniting body and having an image-plane coinciding with the image-plane of the said two objectives, the image-uniting body being situated at such a distance from the common image-plane of the objectives and ocular that between two separated half pictures there is produced a central zone with double images which latter coincide on adjustment of the instrument for a given object and form with the half or part images a single full image of the object for which the adjustment is made.

In testimony whereof I have signed this specification in the presence of two subscribing witnesses.

HEINRICH JACOB.

Witnesses:
 HENRY HASPER,
 WOLDEMAR HAUPT.